Nov. 7, 1933.  K. H. MOLL ET AL  1,934,081
SHAFT FURNACE
Filed July 30, 1931
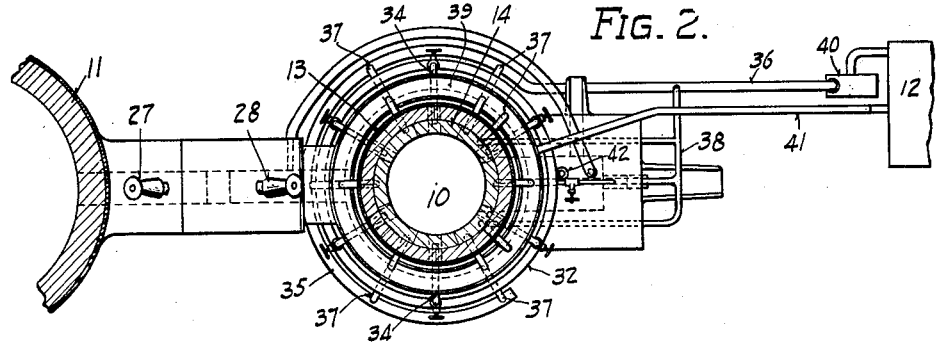
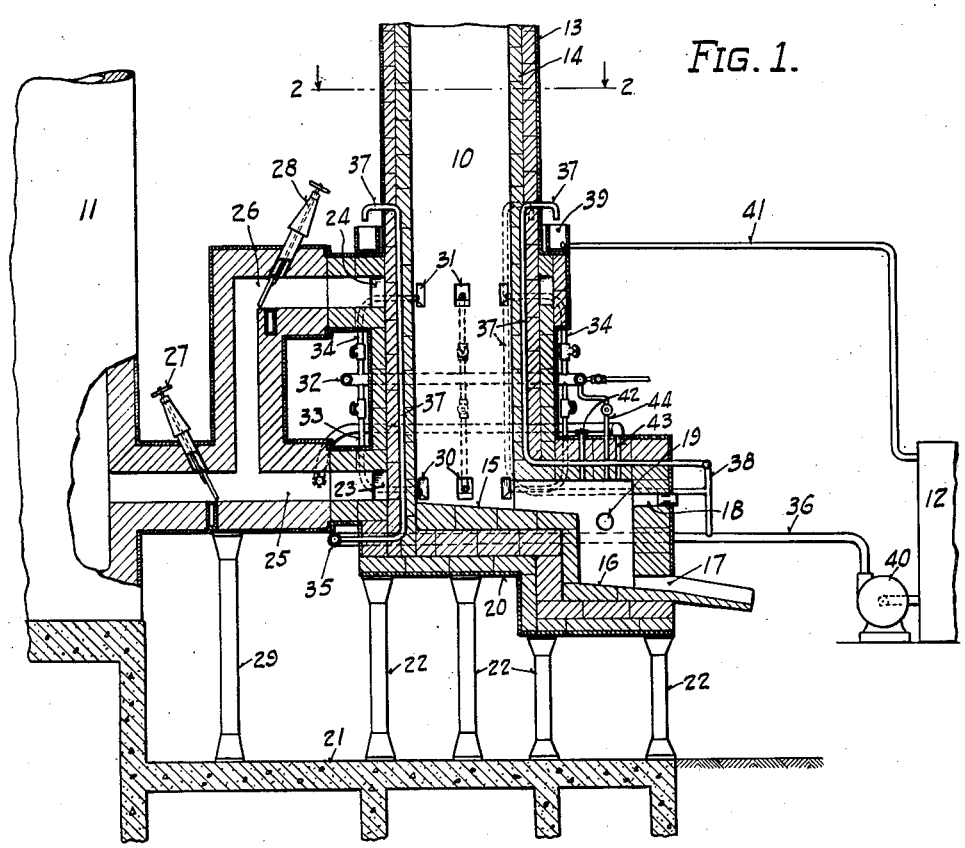
INVENTORS:
Karl H. Moll
Harold Etherington
David F. Smith
BY
ATTORNEY.

Patented Nov. 7, 1933

1,934,081

UNITED STATES PATENT OFFICE 1,934,081

SHAFT FURNACE

Karl Hermann Moll and Harold Etherington, Milwaukee, and David F. Smith, Whitefish Bay, Wis., assignors to A. O. Smith Corporation, Milwaukee, Wis., a corporation of New York Application July 30, 1931. Serial No. 553,948

8 Claims. (Cl. 266—11)

This invention relates to the conversion of iron ore into pig iron or steel and especially to means for utilizing gas for this purpose.

In the reduction of iron ore by means of gas in shaft furnaces as constructed and operated heretofore, the charge has a tendency to agglomerate and stick to the sides of the shaft, the result being that the charge solidifies thereby preventing a uniform reduction of the ore and a uniform passage of the ore through the shaft. Furthermore the charge in its passage through the shaft came into contact with the molten metal which heretofore was collected in the hearth thereby cooling and seriously interfering with the composition of the finished product. Also in furnaces of this type as constructed and operated heretofore considerable difficulty has been experienced due to the fact that the intense heat and the highly heated gases destroy the lining surrounding the highly heated portions of the furnace in a relatively short time.

One of the main objects of the present invention is to provide for the free passage of the charge through the shaft of the furnace when converting iron ore into pig iron or steel.

Another object of the present invention is to provide for the ready removal of the molten metal from the hearth of the furnace as rapidly as it is melted.

Still another object of the invention is to protect the lining of the highly heated portions of the furnace.

Other objects will be apparent from the following description.

In describing the invention, reference will be made to the drawing in which:

Figure 1 is an elevational view partially in cross section of an ore reducing device and Fig. 2 is a plan view partially in cross section taken along the line 2—2 of Fig. 1.

The apparatus comprises a furnace 10, an air heater 11 and a cooling tank 12. The walls of the furnace comprise an outer cylindrical steel casing 13 and an inner lining 14 of fire brick or other suitable heat refractory material. The base portion of the shaft terminates in a hearth 15 which is in direct communication with a forehearth 16. The floors of these hearths are inclined to permit the ready flow of molten metal from the hearth 15 into the forehearth 16 and from the forehearth 16 through tap hole 17 into a ladle or other suitable receptacle when the metal as viewed through inspection hole 18 appears to be in proper condition to be drawn off. A slag hole 19 is provided to remove the slag constituent formed during the melting operation. The furnace structure rests on an offset metallic base plate 20 which in turn is supported from base 21 by stanchions 22.

An air duct 23 which is formed within the lining 14 of fire brick extends around the base portion of the shaft while a similar air duct 24 extends around the shaft at a higher level which level may be approximately one quarter the distance up the stack from the base. These air ducts are connected to the heater 11 by means of heat insulated pipes 25 and 26, valves 27 and 28 being inserted in the pipes to permit regulation of air flowing from the preheater to the air ducts. The heat insulated pipe structure is supported from the base 21 by means of stanchion 29. Communication between air ducts 23 and 24 and the interior of the shaft is established by means of a plurality of ports or tuyères 30 and 31, respectively.

A bustle pipe 32 which is connected to a suitable source of combustible gas encircles the outside of the shaft approximately midway between pipes 25 and 26. From this bustle pipe gas outlet pipes 33 extend through the outer wall of the shaft and are directed through tuyères 30 toward the interior of the shaft. Similar gas outlet pipes 34 also extend from bustle pipe 32 and are directed through tuyères 31 toward the interior of the shaft. Suitable valves inserted in these gas pipes permit regulation of the amount of gas entering the shaft.

As shown more clearly in Fig. 2, a second bustle pipe 35 which is connected to supply tank 12 by means of pipe 36 encircles the lower portion of the furnace. From this bustle pipe a plurality of pipes 37 extend through the outer wall of the furnace upwardly through the lining of heat refractory material and outwardly through the walls of the furnace at a point above the air duct 24. A branch pipe line 38 leads from pipe 36 up to the roof of the forehearth. From this branch line a plurality of similar pipes 37 extend through the walls and roof of the forehearth up through the furnace lining and then out through the walls of the furnace at a point above air duct 24. The upper ends of the pipes 37 empty into an open trough 39 which encircles the furnace. A cooling fluid such as water is adapted to be forced by pump 40 from the supply tank 12 through pipes 36 and 38, through pipes 37, and then into trough 39. A return pipe 41 returns the water or other cooling fluid to tank 12 where it may be cooled by any well known means. The cooling pipes 37 are disposed near the inner face of the fire brick lining and are spaced relatively close together. Although cooling pipes 37 may lead through the walls of the furnace at or near the upper end of the melting zone, they are preferably extended some distance above as shown, the exact distance being determined by the amount of heat generated in the melting zone and the nature of the reducing gas.

As illustrative of one method of producing pig iron or steel in accordance with the present invention, the shaft is charged with a mixture composed of iron ore and sufficient limestone to flux the impurities contained in the ore. Heated air at a temperature of approximately 1000° C. and a combustible gas such as butane are introduced through tuyères 30 and pipes 33 respectively, the air being introduced at approximately 1000 cu. ft. per minute and the gas at approximately 50 cu. ft. per minute. The mixture of air and butane produces a non-oxidizing flame and an intense heat sufficient to melt the iron and slag the impurities. As the iron and slag melt, they flow from the hearth 15 into the forehearth 16 where they are collected and finally tapped into a ladle or other suitable receptacle. This prevents the charge from coming into contact with the molten metal in the hearth which would be the case if the forehearth were not provided.

The highly heated gases produced during the melting of the charge pass upwardly in the shaft and mingle with the butane which is introduced through gas pipes 34 at the rate of approximately 25 cu. ft. per minute. This produces a decomposition of the butane, and the hot gas mixture comprising carbon monoxide, carbon dioxide, water, hydrogen and nitrogen thus produced passes upwardly and reduces the oxide of iron to sponge iron.

The decomposition of the butane is endothermic, therefore, by regulating the amount of butane entering the shaft it is possible to reduce the temperature of the gases ascending from the melting zone to a temperature below that which tends to agglomerate the charge. Under such conditions the charge in its descent through the shaft passes from a zone which is heated to a temperature sufficiently high to reduce the oxides but which is below that which tends to agglomerate the charge to a zone which is heated to temperatures above the melting temperature of the charge without passing through a zone of constantly increasing temperature which causes the charge to agglomerate and stick to the sides of the shaft.

In case more heat is required to raise the charge to reducing temperatures in the upper part of the shaft than that furnished by combustion in the melting zone, additional heated air and gas are admitted through tuyères 31 and pipes 34 respectively. This has the effect of burning a part of the gases in the lower portion of the reducing zone, thereby providing the additional heat required.

During this melting operation, the lining surrounding the forehearth and the melting zone ordinarily disintegrates very rapidly due to the highly heated atmosphere necessarily maintained in these portions of the furnace and to the corrosive action of the highly heated metal and slag. To overcome this destructive action cooling fluid such as cold water is forced from tank 12 by pump 40 through the cooling pipes 37 and out into trough 39 from whence it is returned to tank 12 by means of pipe 41. The simultaneous flow of a separate stream of cold water through each of these cooling pipes dissipates the heat as rapidly as it is absorbed by the lining surrounding these portions of the furnace.

In blowing in the furnace, the shaft is filled to approximately three-quarters its capacity with coke and the remainder is filled with charge. Heated air is blown through tuyères 30 to burn the coke thereby heating the walls of the furnace and the superimposed charge to reducing temperatures. As the coke is consumed the charge becomes reduced and gas is admitted through pipes 33. As the charge settles into the melting zone, it is melted under the influence of the heat generated by the burning of the gas. The coke is finally eliminated by combustion and by solution, and thereafter the melting is done solely by the combustion of gas admitted through pipes 33. In the event additional heat is required to maintain the material in the state of fusion in the forehearth, it is obtained by admitting a suitable mixture of air and gas through pipes 43 and 44 respectively.

The normal operation comprises charging the mixture of iron ore and fluxing material into the top of the shaft, regulating the heated air and gas introduced into the base of the melting zone to produce a smelting flame, and balancing the cooling effect of the reducing gas introduced at the base of the reducing zone with the temperature of the gases ascending from the melting zone so that the temperature in the reducing zone is below that which tends to agglomerate the charge, but high enough to reduce the oxides in the ore. Furthermore, the operation of the furnace consists in draining the molten charge from the hearth into a forehearth as rapidly as the charge melts. In addition the operation of the furnace consists in simultaneously forcing a separate stream of cold water through each of the cooling pipes embedded in the lining surrounding the melting zone and forehearth of the furnace to protect these portions of the furnace from the destructive action of highly heated gases.

The term "smelting flame" as used in the specification and claims refers to flames which are slightly reducing and to flames which are slightly oxidizing as well as to flames which are neutral. High temperatures and atmospheres which are not strongly oxidizing are important conditions to observe in the operation of the melting zone. However deviations from exact neutrality on the reducing side and on the oxidizing side do not seriously affect the production of high temperatures in the melting zone or the composition of the gases which ascend through the shaft for purposes of heating and reducing the charge.

The amount of carbon in the finished product may be increased in any suitable manner. For example, it may be added by blowing free carbon through opening 42 in the roof of the forehearth, by mixing a predetermined amount of coke with the charge, or by blowing carbonaceous dust through tuyères in the melting zone.

We claim:

1. In a device for reducing ore, a vertically disposed shaft, the lower portion of which comprises a melting zone and the upper portion of which comprises a reducing zone, means for admitting a mixture of air and gas into said melting zone, and means for admitting air and gas into said reducing zone.

2. In a device for reducing ore, a vertically disposed shaft the lower portion of which comprises a melting zone and the upper portion of which comprises a reducing zone, means for burning a mixture of air and gas in said melting zone to heat said zone to temperatures above the melting point of a metal obtainable from said ore and to heat said reducing zone, and means for introducing a predetermined amount of reducing gas into said reducing zone.

3. In a device for reducing ore, a vertically disposed shaft the lower portion of which comprises a melting zone and the upper portion of which comprises a reducing zone, means for introducing reducing gas in said reducing zone for producing metal, means for burning a mixture of air and gas in said melting zone to produce a flame in said zone for melting said metal, and means for draining melted metal from said melting zone.

4. In a device for producing steel, a vertical shaft for holding a charge comprising a mixture of iron ore and flux, means intermediate the ends for passing reducing gas into the charge in a portion of the shaft, means for burning a mixture of air and gas in the lower portion of said shaft to produce a flame for melting the reduced charge, and means for draining the molten product from said shaft as rapidly as said reduced charge is melted.

5. In a device for reducing ore, a vertically disposed shaft, the lower portion of which comprises a hearth and a melting zone and the upper portion of which comprises a reducing zone, means to produce a flame by burning a mixture of air and gas in said melting zone to heat said zone to temperatures above the melting point of iron, means for introducing reducing gas in said reducing zone, and a forehearth associated with said hearth for draining molten iron from said hearth.

6. In a device for reducing ore, a vertically disposed shaft, the lower portion of which comprises a hearth and a melting zone and the upper portion of which comprises a reducing zone, a forehearth associated with said hearth, and means for producing a flame by burning a mixture of air and gas in said forehearth and said melting zone to heat said forehearth and said melting zone to temperatures above the melting temperature of iron.

7. In a device for reducing ore, a vertically disposed shaft, the lower portion of which comprises a hearth and a melting zone and the upper portion of which comprises a reducing zone, a forehearth associated with said hearth, means for introducing reducing gas into said reducing zone, means for burning a mixture of air and gas in said forehearth and said melting zone to heat said forehearth and said melting zone to temperatures above the melting temperature of a metal obtainable from said ore, a lining of heat refractory material for confining said heat and gas in said forehearth and said shaft, and means for cooling said lining.

8. In a device for reducing ore, means comprising a vertically disposed shaft for holding a charge of said ore, means for burning a mixture of air and gas in the lower portion of said shaft to melt said charge, means for admitting reducing gas into said shaft above the point of fusion of said charge, and means for draining a reduced and molten product from said lower portion as rapidly as the same is melted.

KARL HERMANN MOLL.
HAROLD ETHERINGTON.
DAVID F. SMITH.